United States Patent Office 3,419,492
Patented Dec. 31, 1968

3,419,492
DESALINIZATION OF AQUEOUS SOLUTIONS
Herman S. Bloch, Skokie, Ill., assignor to Universal Oil Products Company, Des Plaines, Ill., a corporation of Delaware
No Drawing. Continuation-in-part of application Ser. No. 376,561, June 19, 1964. This application Sept. 5, 1967, Ser. No. 665,226
8 Claims. (Cl. 210—32)

ABSTRACT OF THE DISCLOSURE

A composition for use in a processing scheme designed to separate water from an aqueous salt solution—e.g. sea water. The compounds are water-insoluble polymers of aliphatic and/or aromatic, ethylenically unsaturated amino acids which are cross-linked with a ketone and/or an aldehyde. The acid-acting radical of the amino acid is selected from the group of sulfonic and carboxyl, and is substituted on a carbon atom separted from the carbon atom bearing the amino group by not more than five intervening carbon atoms. Preferred compositions are those polymers which are cross-linked by formaldehyde and/or acetole—i.e. an aromatic ethylenically unsaturated carboxylic amino acid cross-linked by acetole.

RELATED APPLICATIONS

The present application is a continuation-in-part of my copending application Ser. No. 376,561, filed June 19, 1964, now U.S. Patent No. 3,351,549, issued Nov. 7, 1967, all the teachings of which patent are incorporated herein by specific reference thereto.

APPLICABILITY OF INVENTION

This invention involves the process of separating water from an aqueous solution of a salt by removing both the negative and positive ions of the salt from the solution, in which process the feed stock is contacted with a particular ion-retention agent or resin containing polar radicals selected from certain ionic groups which entrap the salt ions by a retention mechanism involving mutual attraction between the oppositely charged polar groups residing respectievly on the resin and in the ionized salt. The electrical charges of the polar groups in the resin in effect neutralize the negative charge on the anion, and the positive charge of the cation in the salt. More specifically, the invention concerns particular ion-retention agents to be employed in increasing the water content of an aqueous solution by the withdrawal and retention of the ionic components of a salt in said solution, to form a product solution, the salt concentration of which may be reduced substantially to nil. By a special desorption treatment of the "spent" ion-retention material, a salt concentrate may be produced as either the primary or secondary product.

The organic compositions utilized in the present process as the ion retention agents, acquire a relatively more "spent" condition after they have absorbed a quantity of salt ions from the aqueous salt solution supplied to the process as feed stock, the quantity of salt retained by the adsorbent being dependent upon the temperature of the feed solution and the concentration of salt in solution which is in equilibrium with the salt adsorbed by the ion retention agent. The spent composition may thereafter be restored to its active or "regenerated" form by contacting the spent composition with water (referred to herein as a "desorbent") in which the salt concentration is below the level at which the salt in solution is at equilibrium with the salt retained on the resin during the preceding ion-retention stage of the process cycle. The absorbed salt ions in the composition tend to migrate from the spent ion retention agent into the aqueous "desorbate" phase. The salt concentration in the aqueous desorbent phase rises in direct proportion to the regeneration temperature and the salt content of the spent composition.

When ion retention agents of the present invention are employed as an integral part of a salt recovery process, the effluent desorbate stream comprises an aqueous salt concentrate from which the remaining water may be evaporated or removed by other means, where the salt, in a dehydrated form, is the desired end product of the process. The recovery of a salt concentrate from the spent ion retention agent during the desorption stage of the process cycle, therefore, is in effect a dewatering process on the feed stock solution as the first step in producing the dry or anhydrous salt by further removal of the remaining water from the desorbate concentrate. By thus increasing the concentration of salt in the saline solution as a result of the desorption of salt from the spent ion retention agent in the sequence of steps comprising the present process, a major portion of the water present in the relatively dilute aqueous solution comprising the original feed stock is thereby eliminated prior to the final stage of preparing the dried salt product. The present method of desalinization, therefore, reduces the quantity of water which must ultimately be evaporated from the feed stock solution to recover the solute in an anhydrous form. The process, to which the present invention is applied, accordingly provides a means for effecting such initial reduction in the proportion of water in the feed stock solution more effectively and more economically than processes of the prior art, such as evaporation, ion exchange, electrophoresis and other conventional procedures.

One of the principal and most useful applications of the present invention, in a process for recovering water from an aqueous salt solution, resides in the separation of substantially pure, ion-free water from a feed stock salt solution for the sake of the water component itself. For this purpose, the feed stock solution utilized for such water recovery is preferably a solution of minimum salt content; since the capacity of the ion retention agent and its efficiency in the desalinization process is inversely proportional to the concentration of salt in the feed stock solution, the yield of water per unit of fed stock increases in inverse proportion to the salt content of the fed stock. This adaptation of the process provides a means for producing potable water at a stage in the growth of world population when the present sources of water are rapidly becoming inadequate. New sources of supply are being actively sought throughout much of the world, not only for purposes of direct human and animal consumption to sustain life and maintain sanitary standards, but also for the irrigation of plant life and for the vast number of other uses requiring potable water. Although sea water is readily avalable in virtually unlimited quantities and may be pumped inland for substantial distances to available heating facilities and to sources of electric power and other forms of energy, the recovery of potable water from sea water by presently known methods presents a formidable problem of cost. The separation of water from its saline solutions, using such facilities as distillation, freezing, membrane dialysis, ion exchange, etc., involves the consumption of large quantities of heating, cooling and electrical utilities or requires such large outlays of capital for equipment that the per unit cost of potable water (containing not more than 500 p.p.m. by weight of solids) produced by such means from sea water generally exceeds the upper limit of acceptable cost which is generally about 40 cents per thousand gallons for drinking water purposes and about 19 cents per thousand gallons for irrigation purposes. Except for special uses of potable water which would justify a cost exceeding such limits, the foregoing conventional procedures have been generally discredited as reasonably feasible means for the production of potable water on a large scale.

On the other hand, in the aforementioned use of the present process for the production of salt concentrate from which the anhydrous salt may be recovered, for example, by further removal of the remaining water from the concentrate by distillation or by other means, the feed stock to the desalinization process is preferably as concentrated as feasibly available, and its desirability for this purpose increases as the concentration of salt in the feed solution increases or is inversely proportional to the ratio of water to salt in the solution.

The present process, employing the ion retention agents of the present invention, is operated on a repeating and alternating cycle of heating and cooling, comprising initially absorbing ions from the salt solution on the ion retention agent at the coolest temperature of the cycle, followed thereafter by removal or desorption of the ions from the "spent" retention agent at the relatively elevated temperature maintained during the regeneration phase of the cycle. The resulting, relatively large variations in temperature would normally involve the expenditure of substantial quantities of heat to effect the large temperature swing between the absorption and regeneration stages of the process; however, the heat involved in effecting such temperature swing consists entirely of sensible heat and the resulting net consumption of heat for this purpose is much less than that required to provide the latent heat of vaporization or the latent heat of fusion in operating a desalinization process by either of the evaporation or freezing mechanisms involved in processes of desalinization in the prior art. Moreover, the use of the present process flow, which involves a heat exchange principle in which the heating and cooling capacity of the several process streams are alternately stored in, and thereafter recovered from the resinous ion retention agent, provides an especially advantageous application of the process flow described in U.S. Patent No. 2,985,589, issued to D. B. Broughton et al., whereby a major proportion of the heating and cooling demands of the process can be recovered thereby reducing the ultimate cost factors involved in the process to substantially nil. Through such special uses of the heat exchange capacity of one of the phases present in the process flow in the present method, the recovery of the water component and/or the recovery of the salt component of an aqueous saline solution may be accomplished with only nominal consumption of heating and other utilities.

OBJECTS AND EMBODIMENTS

In one of its embodiments, this invention relates to a process for the desalinization of an aqueous salt solution which comprises contacting said solution at a relatively low datum temperature with an ion retention agent comprising an organic composition containing acid-acting and base-acting polar groups in substantially equal number, substituted on carbon atoms in the molecular structure of the composition in an arrangement of said groups which provides a succession of alternating acidic and basic substituents on the carbon atom skeleton, whereby substantially each acid-acting group is adjacent to a base-acting group to form a dipolar aggregate which, on contact with said solution, retains the electropositive and electronegative ions of the salt in solution, and forms a resulting ion retention agent at least partially spent with respect to its capacity to retain additional charged ions, and withdrawing at said datum temperature from the ion retention agent containing absorbed thereon the salt ions originally present in said solution a water product having a lower concentration of salt than said solution.

Another embodiment of the present invention concerns a means for restoring the activity of the ion retention agent for further use in contacting additional feed stock solution which comprises contacting the ion retention agent containing absorbed salt with water at a temperature relatively more elevated than said datum temperature and removing at said elevated temperature a desorbate effluent of higher salt concentration than said feed stock solution from a resulting regenerated ion retention agent.

Other embodiments of my invention relate to specific ion retention agents, special conditions of temperature and salt concentrations at which the process operates and other specific aspects relating to the process, and especially the ion retention agent upon which the process is based. These will be referred to in greater detail in the following further description of my invention.

For example, a specific embodiment encompassed by my invention, provides an organic substance having heat-reversible ion retention capacity and being the composition formed by treating the polymer of an ethylenically unsaturated carboxylic amino acid in which the number of amino acid monomer units in the polymer is sufficient for said polymer to be water-insoluble, with a ketone at condensation reaction conditions; said substance further characterized in that (a) said ketone reacts with the amino group to form a composition having a higher melting point than said polymer, and (b) the carboxyl group is substituted on a carbon atom separated from the carbon atom bearing the amino group by not more than five intervening carbon atoms.

In another specific embodiment, the present invention is directed toward a process for the desalinization of an aqueous solution of a dissolved salt which comprises contacting said solution at a low datum temperature with an ion retention agent comprising a water-insoluble composition containing an acid-acting radical selected from the group consisting of sulfonic and carboxyl and a base-acting amino radical, cross-linked by a carbonyl compound selected from the group consisting of aldehydes and ketones, each of said acid-acting and base-acting radicals being substituted on carbon atoms in the molecular structure of the composition separated by not more than five intervening carbon atoms, whereby substantially each acid-acting group adjacent to a base-acting group forms a di-polar aggregate which on contact with said solution withdraws the electropositive and electronegative ions of the salt from the solution and forms a resulting complex between the acid-acting and base-acting radicals in the ion retention agent with the electronegative and electropositive ions of said salt and withdrawing at said datum temperature from the ion retention agent containing absorbed thereon the salt ions originally present in said solution a water product in which the concentration of salt is less than the salt concentration of said solution.

SUMMARY OF INVENTION

The desalinization of aqueous salt solutions in accordance with the process of this invention is dependent upon the effectiveness of a water-immiscible composition referred to herein as an ion retention agent, or resin, which is capable of forming an addition-type complex with the salt component of the aqueous solution. By contacting the feed stock solution with the compositions encompassed by the present invention, the salt ions in solution are retained in a separately recoverable phase, thereby extracting the latter from the feed stock solution and leaving, as the other phase, water of greatly reduced salt content. The process, accordingly, is dependent upon the capacity of the ion retention agent for retaining the salt ions in an absorbed state on or in the composition, as water of reduced salt content, at the lowermost or datum temperature provided by the process, is withdrawn from the spent resin as non-absorbed reffinate product. The feasibility of the present desalinization process as an economically justifiable means for producing a product of low cost is also dependent upon the ability of the composition to release its absorbed salt ions, extracted from the aqueous feed stock solution, without the expenditure of large inputs of energy, or by other costly procedures for restoring the ion retention agent to its active or "regenerated" state. An integral phase of the over-all process is the release of the salt ions from the "spent" ion retention agent at conditions which disrupt ionic equilibrium between the ions present in the surrounding fluid phase and the ions already present in an absorbed state on the ion retention agent, whereby the ions present in the ion retention agent migrate from the resin to the surrounding fluid phase. Such disruption of ionic equilibrium is effected either by increasing the temperature of the surrounding fluid phase (the aqueous desorbent) to a level more elevated with respect to the initial "datum" temperature, by reducing the salt content of the surrounding fluid phase below the salt concentration of the initial feed stock solution supplied to the process, or by combining both of the aforementioned means in a unitary regeneration procedure to promote the rate or the degree of salt removal from the ion retention agent by the mutually additive effect of both temperature and the disruption of ionic equilibrium. Although, presumably, the aqueous feed stock solution can be utilized as the source of water to effect desorption of the salt ions from the "spent" resin, at a more elevated temperature than the level at which salt absorption took place, the absorbed ions are more nearly in equilibrium with the ions in the desorbent solution contacted therewith so that the resulting reduction in the rate of ion transfer from the ion retention agent into the desorbent, when using the feed stock solution as the source of desorbent, is lower than when using deionized water or a solution of lower salt content than the feed stock. A stepwise decrease in the salt content of the desorbent stream contacted with the "spent" ion retention agent, for example by first charging feed stock heated to the elevated temperature of the desorbent into the desorption zone, followed thereafter by contacting the resulting, partially regenerated ion retention agent with deionized water at the elevated desorption temperature is advantageous in that the procedure reduces the total quantity of deionized water required for the desorption or regeneration stage of the cycle.

The foregoing heat-reversible, ion-retaining properties of the present ion retention agents enable the salt ions to be desorbed from the spent composition during the regeneration stage to thereby supply a regenerated resin for repeated use of the same composition in a cyclic flow arrangement for further removal of ions from the feed stock solution at a more downstream portion of the cycle.

The ion retention agents utilized herein to remove dissolved salts from aqueous feed stock solutions are members of a group of materials which are capable of forming a reversible complex with both the electronegative and the electropositive ions of the salt component of the solution. The designation of these compositions, as ion retention agents, is thus an indication of their function in the present process, the agent in each case acting essentially as a means for withdrawing the salt ions from the solution and retaining the salt in the form of an addition complex with the composition in a sufficiently tenacious combination and for a sufficient length of time to permit the withdrawal of salt-depleted water from the downstream outlet of the ion retention zone. The ion retention zone of the process cycle must therefore contain sufficient ion retention capacity in the form of the water immiscible ion retention agent to remove all of the salt ions from the feed stock solution at the feed stock flow rate, and at the temperature and salt concentration at which the feed stock is supplied to the process.

The composition employed herein as the ion retention agent must also have the aforementioned property of reversibly releasing the salt from its addition complex with the composition as the temperature of the surrounding aqueous phase is increased beyond the ionic equilibrium temperature for the aqueous phase in contact with the "spent" composition. These properties characterize generally certain macromolecular weight solid resinous or resin-like materials which qualify as ion retention agents in the present process.

Compositions capable of functioning as ion retention agents of the present invention contain radicals having both base-exchange and acid-exchange activity, which, because they are spaced apart in the same molecule, act in their individual capacities as electronegative and electropositive ion traps, but which, because of their close proximity in the same molecule, form dipolar ionic groups or internal salts of a class referred to in the art as "Zwitter ions." A common form of the acid-base or dipolar ion exchange groups are the amino acids, which structurally may be considered as the disubstituted ammonium salts of carboxylic or sulfonic acids having aliphatic, carbocyclic or heterocyclic aromatic or naphthenic structures supporting the amino and acid groups as substituents. The essential, reactive unit present in the structure of the ion retention compositions of this invention may also be visualized as acid-base compositions of substantially isoelectric neutrality, but which, because of the intervention of at least one, up to about five carbon atoms between the carbon atoms bearing the acid and base groups respectively, do not react to form rigidly stable internal salts via neutralization of the amino groups with the carboxylic and/or sulfonic acid groups present as substituents within the compositions. As heretofore indicated, the acid portion of the dipolar ion group may be present as a carboxylic or sulfonic acid radical, the former in partially or completely hydrolyzed proteins (i.e., as a mono- or polyamino acid) and the latter in certain synthetic compositions containing the sulfonic acid radical ($-SO_3H$) and the amino base radical in the form of a polymeric ammonium or alkyl ammonium sulfonate composition. Thus, the dipolar ion units present in the structure of the compositions herein utilized as ion retention agents include both the amino-carboxylic acids and the amino-sulfonic acids as homogeneous or heterogeneous compositions.

The present compositions utilized as ion retention agents may also contain a predominance of either amino groups or acid groups in any particular structure and, therefore, are not necessarily wholly neutral and may have a pH either greater or less than 7.0. In order to prevent internal salt formation between the amino and acid groups contained in the structure of the dipolar ion, these groups, respectively, are substituted on carbon atoms separated by one or more, up to about five, intervening carbon atoms and more preferably, they are separated by from one to three carbon atoms between the carbon atoms bearing the amino and acid groups, respectively. The effective field of ion retention activity provided by the electropositive and electronegative ionic groups in the ion retention agent, thereby corresponds approximately to the field of the electropositive and electronegative ions of a molecule of ionized sodium chloride or other inorganic salt.

The present ion retention agents effect the removal of salt ions from aqueous solutions by means of a mechanism illustrated in the following equation for a resin containing an amino group and a carboxylic acid group acting on sodium chloride as an illustrative example:

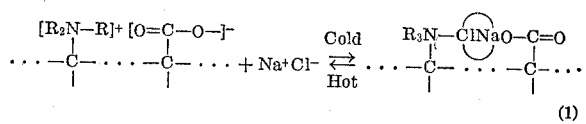

(1)

where R is selected from the group consisting of hydrogen, alkyl containing from 1 to 5 carbon atoms, phenyl, benzyl and alkylphenyl, at least one of said "R" groups being hydrogen. In accordance with the mechanism of the ion retention process involved in the present invention, the electropositive ammonium ion, existing in the molecular structure of the ion retention agent, exerts an attractive effect on the electronegative chloride ion of sodium chloride present in the aqueous solution; simultaneously the electronegative carboxyl group present in the ion retention agent exerts an attractive effect on the electropositive sodium ion of the sodium chloride existing in a freely mobile form in the aqueous solution. At the relatively low datum temperature utilized for treatment of the aqueous feed stock solution during the ion retention phase of the process, the respective positive and negative sodium and chloride ions of the salt migrate to the attracting, oppositely charged ionic groups present in the ion retention agent, both ions being loosely held within the ionic field of the firmly held positively and negatively charged acid-acting and base-acting groups comprising the ion retention agent. The mobile salt ions, however, are held in the dipolar complex only as long as the ambient temperature does not rupture the bonds between the salt ions and the antipode groups in the ion retention agent. At the elevated desorption temperatures provided in the present process the bonds existing between the oppositely charged ionic groups in the salt and in the ion retention agent are ruptured, regenerating the free electropositive ammonium radical and the electronegative carboxyl or sulfonic radical of the ion retention agent, simultaneously releasing the sodium chloride as a mobile ionic entity into the aqueous phase surrounding the ion retention agent. The proportion of "regenerated" to total resin or the ratio of free carboxyl or sulfonic acid groups and amino base radicals to total carboxyl plus carboxylate, sulfo plus sulfonate, and amino plus ammonium radicals increases as the temperature of the treating agent increases, (depending upon the composition of the ion retention agent, the concentration of salt in solution and the identity of the salt), except that, at certain "threshold" temperatures, generally substantially below the boiling point of the aqueous desorbent, the treating agent is essentially wholly regenerated at any concentration of solute in the desorbent. What is true for the detention of the sodium and chloride ions of sodium chloride, one of the more common components of sea water, is also generally true for other metal-derived electropositive and electronegative ions of other salts, such as the electropositive calcium and magnesium ions of calcium chloride and magnesium chloride respectively, or the electropositive potassium and lithium and the electronegative sulfate ions of potassium and lithium sulfates as well as the ionic radicals of various other salts which are soluble in water.

The treating or ion retention agents which contain amino acid dipolar or Zwitter ion groups as the active ion-retention centers present in their molecular structures are provided by a variety of materials which may be derived from naturally-occurring sources, or prepared synthetically by polymerization of monomers containing one or more amino groups and carboxylic and/or sulfonic acid groups per molecule. For example, both amino and carboxyl groups are present in or derived from water-insoluble proteins or proteinaceous materials, such as casein, leather, animal hair, soya bean proteins, nut proteins and the like, generally having molecular weights above 3000, up to about 75,000. Some of the preferred naturally occurring proteins and protein-conversion products are obtained by partial enzymatic or acid hydrolysis of a natural protein in the presence of a weak aqueous acid solution which reduces the molecular weight of the protein and hydrolyzes a portion of the carboxyamide linkages present in the molecular structure of the protein to the free amino acids.

In a process for treating a liquid feed stock utilizing the treating agent in solid particle form, it is, of course, a necessary requirement of the solid thus used that it remain in the solid phase during the process and that it continue to be essentially insoluble in the aqueous phase at either the ion retention stage of the process or the desorption stage thereof. Accordingly, materials which tend to melt or which tend to dissolve in the aqueous phase at the relatively elevated desorption temperatures are preferably pretreated with a modifying agent prior to use in the process in order to convert the ion retention agent into a water-insoluble and/or a refractory material to render the particular substance more useful and more suitable for the present ion retention-desorption process cycle. For this purpose, the material used as the ion retention agent, when derived from a substance of low melting point or of high water solubility is desirably pretreated prior to use with a reagent including low molecular weight aldehydes, such as formaldehyde, acetaldehyde (or its trimer: paraldehyde), glyoxal, acrolein, propionaldehyde, crotonaldehyde, or other aldehydes containing up to about 5 carbon atoms per molecule or with an acylating agent such as acetyl chloride, formyl chloride, propionyl chloride, the corresponding bromide analogs or other acylating agents, such as the acid anhydrides which substitute the involved acyl radical into some of the resident free amino groups present in the monomer, replacing a hydrogen atom of the amino group and converting the proteinaceous monomer to the corresponding condensation product with the aldehyde or acylating agent, having a higher melting point and lower water solubility than the unmodified monomer. The preferred members of the above modifying reagents are formaldehyde, formyl chloride, and formyl bromide because of their high activity and the modified product produced therefrom possesses many of the physical and chemical properties which are desirable for ion retention agents used for this purpose. The condensation reaction between the aldehyde or other acylating agent and the protein-like ion retention agent involving at least some of the free amino groups present in the substance, and especially the amino groups released by acid hydrolysis from the amide or ammonium salt is effected and promoted by caustic or a base, such as a dilute solution of sodium hydroxide, potassium hydroxide, sodium carbonate, lithium hydroxide, etc., and at temperatures of from about 20° to about 80° C., the condensation product generally separating from the aqueous phase as a solid which may be molded into particles having large surface area in order to enhance its efficiency in the desalinization process.

Another modification of the composition and structure of the ion retention agent, particularly applied when the premodified form is a substance having a low melting point or when it is a water-soluble material, is the variation in which some of the free amino acid groups are condensed with a reactive ketone, preferably with an hydroxy ketone such as acetol ($CH_3COCH_2OH$), which undergoes condensation with the free amino and free acid groups to form a product capable of chelating with the electropositive and the electronegative ions of the salt in the feed stock solution. The amino carbonyl cross-linkage resulting from the condensation between the amino group of the ion retention agent and the carbonyl group of the modifying agent is formed via a mechanism substantially similar to the reaction represented by the following which illustrates the modification of an amino acid containing a carboxylic acid group with acetone:

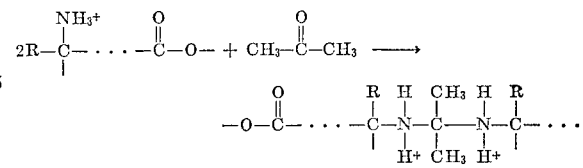

(2)

Compounds other than acetone which contain the reactive keto groups and which preferably contain not more than five carbon atoms on either side of the carbonyl radical form the above type of reaction product with the amino acid ion retention agent, as illustrated above, for acetone, including such compounds as mesityl oxide, phorone, ditertiarybutylketone, acetylacetone, methylpropylketone, diethylketone, diacetylbenzene, diacetone alcohol, di-n-propyl ketone, diisopropylketone, etc. The condensation is generally effected by heating a mixture of the reactants, that is, the ketone with the amino acid, to a temperature preferably from about 50° C. to about 200° C. and thereafter removing the excess ketone from the condensation product, for example, by distillation or by extraction with a solvent such as water.

Synthetic, resin-like ion absorption agents having dipolar or internal salt structures are utilizable in the present desalinization process in either of two major physical forms: (1) solid, water-insoluble cross-linked polymers of unsaturated monomers containing both basic amino and acidic dipolar groups, as herein described; these polymers are useful in a procedure in which the liquid saline solution is contacted with a bed of solid particles of the ion retention agent or with a solution of the ion retention agent in a solvent immiscible with the aqueous feed stock solution, and (2) liquid organic compounds containing the functional amino and acid groups as substituent polar radicals, having molecular weights sufficiently high (that is, above about 250) that the compound is substantially immiscible with the feed stock solution, either individually or in solution in a solvent itself immiscible with saline feed stock solutions. Such liquid ion retention agents or a solution of the composition in a liquid solvent are used in a process flow equivalent to a liquid-liquid extraction procedure, for example, under countercurrent flow conditions and preferably in an arrangement in which one of the phase is dispersed as liquid droplets in the other liquid phase, as shown in U.S. Patent No. 2,746,846 issued to G. R. Grunewald et al.

The aforementioned solid resinous polymers which may be conveniently utilized either in a particulate solid form or dissolved in a liquid solvent immiscible with the feed stock solution are prepared by the polymerization of ethylenically unsaturated amino acids. The term: "ethylenic unsaturation" is intended to designate the presence of a mono-olefinic double bond in an aliphatic substituent present in the molecular structure of the monomer enabling the monomer to undergo interpolymerization with another ethylenically unsaturated monomer of the same or different composition. Typical utilizable unsaturated monomers which polymerize to form solid, resin-like copolymers at appropriate polymerization conditions include, for example, the following: the various ortho-, meta- and para-vinyl-substituted aminosulfonic acid derivatives of benzene, including the various side-chain position isomers and especially and more preferably, the isomers in which the sulfo and amino groups are substituted on carbon atoms of the ring separated by at least one nuclear carbon atom, such as 2-amino-4-sulfo-styrene, 2-amino-5-sulfo-styrene, 2-amino-6-sulfo-styrene, 3-amino-5-sulfo-styrene, 4-amino-6-sulfo-styrene, 3-amino-6-sulfo-styrene, 3-amino-5-sulfo-alphamethyl styrene, and the meta, sulfo- and para-sulfo-N-vinyl-anilines and more preferably, as aforesaid, the isomers in which the sulfo group is para to the amino group. Another general group of compounds utilizable herein as the polymerizable monomers for the formation of the ion retention agents hereof are the styrene derivatives containing substituent amino and carboxyl radicals which are substituted either on the aromatic nucleus or in an alkyl substituent radical, including all of the various position isomers as well as the N-vinyl-aminobenzoic acids, such as 2-amino-4-carboxystyrene, 3-amino-5-carboxystyrene, 2-amino-5-carboxystyrene, 4-amino-2-carboxystyrene or 4-amino-6-carboxystyrene, 3-amino-6-carboxystyrene, 2-amino-6-carboxystyrene, 3-(N-vinyl)-benzoic acid, 4-(N-vinyl)-benzoic acid, and especially the isomers in which the nuclear carbon atoms containing the carboxyl and amino substituents are separated by at least one intervening carbon atom, represented, for example, by 3-amino-5-carboxystyrene, and the meta- and para- N-vinylamino benzoic acids. Still another group of polymerizable monomers which, together with a copolymerizable diene, forms a solid copolymer resinous ion retention agent of the present invention are the taurines and taurine homolgs: N - vinyl-taurine-(N-vinyl-2-amino-ethanesulfonic acid), as well as 3-amino-propanesulfonic acid, 4-aminobutanesulfonic acid, 3-aminobutanesulfonic acid, 5-aminopentanesulfonic acid, 4-aminopentanesulfonic acid, alpha-aminoacrylic acid, alpha-aminobutenoic acid, beta-aminobutenoic acid, and compounds of similar structure in which the carboxyl and amino groups are substituted on carbon atoms separated by at least one, up to five and more preferably not more than three intervening carbon atoms.

Polymers of unsaturated amino acids of the type hereinabove characterized, either individually or in admixture with other unsaturated monomers which form copolymer linkages with the unsaturated amino acid monomer have a greater tendency to be water insoluble, if copolymerized with a cross-linking agent selected from the group consisting of aldehydes and ketones as hereinbefore set forth. The polymerization is generally effected at a temperature of from about 10° to about 300° C., depending upon the reactivity of the monomers. When utilizing a cross-linking agent, such as acetole, for the purpose of increasing the water-insolubility and melting point of the resulting cross-linked polymeric resin, intermediate temperatures in the range of about 50° C. to about 200° C. are employed. The concentration of cross-linking agent is such that the molar ratio of unsaturated amino acid to cross-linking agent is in the range of from about 5:1 to about 2:1.

Since most of the ion retention capacity of the present resins resides in the surface of the ion retention agent (liquid droplet or solid particle) in contact with the aqueous feed stock solution, the salt ions in the aqueous phase being generally incapable of migrating more deeply into the resin structure than the acid and the amino groups on or adjacent to the surface of the particle, the capacity of a given weight of resin for ion retention is dependent upon, among other factors, the state of subdivision of the ion retention agent. The effective ion retention surface of a given weight of the ion retention agent is substantially increased by dissolving the resin or polymeric ion retention agent in a solvent for the resin or polymer, and coating the surfaces of a mass of solid particles of a suitable adsorbent material, such as charcoal, alumine (bauxite), sand, silica gel, or other particles of inert, water-insoluble, preferably porous, material with the resulting solution of the resin and thereafter evaporating the solvent from the particles suffused or impregnated with the solution, leaving a layer of the ion retention agent on the surfaces of the particles. The ion retention agent ultimately fabricated by impregnation of the inert support particle should preferably contain at least 3 percent by weight of the active ion retention agent.

Another alternative modification of the ion retention agent utilizable in the process of the present invention, employing another variation in the method of contacting the aqueous feed stock solution with the ion retention agent, is represented by the formation of tailor-made amino acid molecules which contain large, hydrophobic hydrocarbon groups. The resulting amino acids generally exist in the form of liquids, semi-solids or solids. These ion retention agents are effective when dissolved in an inert solvent which is immiscible with the aqueous feed stock solution, or, if the product is a liquid, the ion retention agent is used directly in a liquid-liquid extraction procedure, with the aqueous feed stock as one of the liquid phases and the liquid amino acid as the other phase. Conventional countercurrent methods of contacting the aqueous feed stock solution with the ion retention agent immiscible therewith may be advantageously used to enhance the efficiency of the process.

Liquid ion absorption agents of the foregoing type for use in a process flow similar to conventional solvent extraction procedures, in which the liquid contains the ion retention agent (either individually or dissolved in a nonaqueous, immiscible solvent), are characteristic of several distinct classes of compounds, including the long-chain alkyl amino sulfonic acids, (also referred to as N-alkyltaurines), preferably containing the amino and sulfo substituents on carbon atoms separated by from one to five intervening carbon atoms, compounds having the structure of the N-alkylalanines, the N-alkyl-ortho-aminobenzene sulfonic acids and compounds of similar structure in which the N-alkyl groups contain a sufficient number of carbon atoms, generally from ten to about thirty per molecule, to render the resulting compound water-insoluble, but oil soluble. Typical illustrative examples of such compounds are N-dodecyl-3-aminopropane sulfonic acid, N,N-dioctyl-3-aminopropane sulfonic acid, N-octadecyl-N-methyl-taurine, N-dodecylbenzyl-3-aminopropane sulfonic acid, N-octylcyclohexyl-3-aminopropane sulfonic acid, N-tridecyl-alanine, N,N-didodecylalanine, N-dodecyl-N-butyl-m-amino-benzene sulfonic acid, N-dodecyl-n-aminobenzene sulfonic acid, 3-dodecyl-5-aminobenzoic acid, 3-amino-4-tetradecylbenzoic acid, N-dodecyl-p-aminobenzene sulfonic acid, etc.

The ion retention stage of the present process cycle is effected at the lowest temperature provided in the process cycle, herein referred to as the "datum" temperature, generally at a temperature of from about 10° to about 40° C., or at whatever ambient temperature the feed stock solution is available for supply to the process. Thus, sea water is generally supplied or available at a temperature level maintained during the process at which maxisorption takes place readily and rapidly. The so-called elevated temperature of the present cycle, or the temperature level maintained during the process at which maximum desorption of salt from the "spent" resin takes place, is generally a temperature within the range of from about 50° to about 100° C., and more preferably from about 70° to 95° C. at atmospheric pressure, up to about 120° C. at from 10 to 15 atmospheres pressure.

The following examples describe and illustrate several typical ion retention resins of this invention. In each instance the resin is tested for its ion retention capacity by the following procedure which, because it is uniformly applied to all samples tested, is a measure of the relative effectiveness of these samples:

TEST METHOD

The following runs describe processes for the desalinization of sea water, the deionized product containing from 10 to about 1000 p.p.m. of dissolved solids, depending upon the particular ion retention agent utilized in the run. The sea water used as feed stock is a solution containing about 3.3% by weight of dissolved solids consisting mostly of sodium chloride, but which also contains significant proportions of other soluble salts, such as the halides, carbonates and sulfates of such metals as calcium, magnesium and potassium. The sea water is supplied to the process at a temperature of about 8° C. flowing directly at this temperature into the top of a vertical column contained in a tube of approximately 2 inches diameter by 3 feet in height packed with the particles of resin undergoing test. The particles of resin are supplied in a variety of sizes to observe the effect of particle size on the capacity of the resin compared on a weight for weight basis. As the sea water feed stock flows through the column of resin particles, deionized water product issues from the bottom of the ion retention column and the flow of sea water is continued until chloride ions appear in the effluent. The capacity of the resin is determined on the basis of the quantity of sea water treated and the quantity of dissolved solids remaining in solution in the effluent raffinate. In the case of the liquid ion retention agents (liquid, that is, at the sea water inlet or "datum" temperature of 8° C.) a weighed quantity of the liquid ion retention agent is placed in a one liter flask and shaken with a given quantity of sea water. Deionized water product is decanted from the upper layer of liquid ion retention agent after settling and the procedure is thereafter repeated with the same sample of liquid ion retention agent until the organic phase becomes "saturated" with salt ions and fails to further remove dissolved solute from the next aliquot of sea water feed stock. The solid ion retention agents, in their spent form, are regenerated and their salt content removed to form a reactivated material by first mixing the deactivated or spent ion retention agent with sea water at 90° C. to partially remove the salt retained by the ion retention agent to an equilibrium concentration of sodium chloride in the solid and solution phases and thereafter the resulting, partially reactivated ion retention agent is further contacted with deionized water at 90° C. to remove substantially all of the remaining salt ions from the ion retention agent. The resulting reactivated ion retention agent is recycled for use in a succeeding run.

EXAMPLES

The following specific ion retention agents, indicating their method of preparation and their physical properties are described as follows:

Example I.—Ion retention resin A

A mixture of 10 molar proportion of the sodium salt of 3-carboxy-6-amino styrene per molar proportion of diacetyl benzene are polymerized by the emulsion technique using benzoyl peroxide (0.96% by weight of the sodium salt or 1.78 weight proportions) as catalyst for the resulting copolymerization reaction. The carboxyl salt and the diacetyl benzene are initially emulsified in a rocking autoclave containing 75 volumes of an aqueous 0.5 percent solution of sodium oleate. After mixing in the autoclave for 15 minutes with the soap solution at 60° C., the monomers form a milky emulsion in the aqueous soap solution. The action of the autoclave is thereafter temporarily interrupted to charge benzoyl peroxide into the emulsion, followed by continuing the rocking action of the autoclave reactor for an additional 35 minutes. During the resulting polymerization, a mass of hard, amorphous solid particles of approximately spherical form and in a size range of from about 0.5 to about 2.5 millimeters in diameter separates from the aqueous phase.

The formed particles of polymer are thereafter filtered from the aqueous phase, washed with water and heated in the presence of three volumes of distilled water to a temperature of about 100° C.; that is followed by draining the resulting aqueous phase from the container at the boiling point of water, replacing the aqueous phase with an additional three volumes of distilled water and again boiling the mixture of water and resin particles. After five successive treatments with boiling water in a manner similar to the above, the aqueous filtrate from the treated resin is substantially free of sodium ions and the recovered resin is packed into the ion adsorption column described above.

Example II.—Ion retention agent B

A $C_{15}$ amino acid is formed by a sequence of reaction steps in which decene-1 (formed by dehydrobromination of decylbromide) is initially reacted with phosgene (carbonyl chloride) and hydrogen chloride in the presence of anhydrous zinc chloride catalyst (2% by weight of the N-decene-1) in a condensation reaction effected in a stirred pressure autoclave at 110° C. and at a pressure of hydrogen chloride maintained at 10 atmospheres, the resulting product consisting predominantly of 1-chloro-formyl-2-chlorodecane. The chlorocarbonyl group is hydrolyzed to the corresponding sodium carboxylate radical by heating the foregoing chlorocarbonyl derivative in an autoclave at 10 atmospheres pressure and at 130° C. with a 10% aqueous caustic solution.

The resulting sodium salt of the monochloroundecanoic acid is thereafter condensed with an equimolar proportion of 1-chloro-2-nitrobutane by mixing the undecanoic acid derivative and the chloronitrobutane with two molar proportions of finely powdered magnesium and heating the mixture in a rotating autoclave containing nitrogen at 50 atmospheres pressure, at a temperature of 80° C. as the autoclave is slowly rotated during a reaction period of approximately three hours. The product which is predominantly 3-nitro-5-carboxymethyltridecane is thereafter mixed with finely divided nickel sulfide (2% by weight of the nitro compound) in an autoclave which is thereafter charged with hydrogen to a pressure of 20 atmospheres and heated for three hours at a temperature of 60° C. as the autoclave is slowly rotated to effect intimate mixing of nickel sulfide catalyst with the salt of the pentadecanoic acid derivative. After cooling the autoclave and recovering the organic product from the inorganic material in the autoclave by elution with 95% ethanol, the alcohol extract is evaporated to dryness and the residue consisting of the sodium salt of the aminopentadecanoic acid is heated in a pressure autoclave with slightly acidified water at 110° C. followed by extraction of the resulting $C_{15}$ amino acid, with dodecane.

The extract solution of the $C_{15}$ amino acid and dodecane is admixed with acetol in a molar ratio of about 15:1, and reacted under condensation conditions by the emulsion technique previously described in Example I. The mass of hard solid particles, substantially spherical in shape, and having a size ranging from approximately 0.5 to about 2.5 millimeters (nominal diameter) are filtered from the liquid phase and washed with water until the aqueous phase from the filtrate is substantially free from sodium ions. The recovered cross-linked resin is then subjected to the ion adsorption test method hereinbefore set forth.

The results of the test method are presented in the following table:

TABLE I.—DESALINIZATION OF SEA WATER BY CONTACT WITH ION RETENTION AGENT

| Ion retention agent [1] | Sea water treated ion retention agent decagrams/-gram [2] | Residual solids in desalinized water, p.p.m. [4] | Restoration of ion retention activity after desorption, Percent [3] |
|---|---|---|---|
| A | 0.54 | 180 | 94 |
| B | 0.35 | 125 | 94 |

[1] As identified and characterized in the foregoing description.
[2] As indicated by the appearance of sodium chloride in the raffinate effluent and based on the quantity of supported material (i.e., support plus ion retention agent) present in the phase contacted with the feed stock (sea water).
[3] Average of ten successive desorption-regeneration procedures on the same sample of ion retention agent.
[4] Measure of the solids content of the last 100 cc. of the raffinate effluent withdrawn from the spent ion retention agent; the solids content of the first 10 cc. of raffinate is, in each instance, nil.

The foregoing specification, and the examples presented therein, clearly illustrates the use of the ion-retention agents of the present invention in the desalinization of sea water, and indicates the benefits afforded through the utilization thereof.

I claim as my invention:

1. A solid organic water-insoluble cross-linked polymer having heat-reversible ion retention capacity formed by reacting an amino compound with a ketone at polymerization-condensation conditions, said amino compound being selected from the group consisting of (1) monocyclic aromatic amino compound containing a nuclearly attached amino group, an acid group and an ethylenically unsaturated aliphatic radical, the acid group thereof being sulfonic or carboxyl and being substituted on a nuclear carbon atom separated from the nuclear carbon atom bearing the amino group by one or two intervening carbon atoms and (2) aliphatic ethylenically unsaturated amino compound containing an acid group in which the acid group is sulfonic or carboxyl and is substituted on a carbon atom separated from the carbon atom bearing the amino group by from one to three intervening carbon atoms.

2. The polymer of claim 1 further characterized in that said ketone is acetol.

3. The polymer of claim 1 further characterized in that said amino compound is an aliphatic ethylenically unsaturated carboxylic amino acid.

4. The polymer of claim 1 further characterized in that said amino compound is a benzene compound containing a nuclear vinyl radical.

5. A process for the desalinization of an aqueous solution of a dissolved salt which comprises contacting said solution at a low datum temperature with an ion retention agent comprising the water-insoluble polymer of claim 1, substantially each acid group of the polymer adjacent to an amino group of the polymer forming a dipolar aggregate which on contact with said solution withdraws the electropositive and electronegative ions of the salt from the solution, and forms a resulting complex between the acid and amino groups in the ion retention agent with the electronegative and electropositive ions of said salt, and withdrawing at said datum temperature, from the ion retention agent containing absorbed thereon the salt ions originally present in said solution, a water product in which the concentration of salt is less than the salt concentration of said solution.

6. The process of claim 5 further characterized in that the activity of the ion retention agent, for further use in contacting additional feed stock solution, is restored by contacting the ion retention agent, containing absorbed thereon the salt ions withdrawn from said solution in the ion retention stage of the process, with water at a temperature relatively more elevated than said datum temperature and removing at said elevated temperature a desorbate effluent of higher salt concentration, than said feed stock solution, from the resulting regenerated ion retention agent.

7. The process of claim 5 further characterized in that said polymer is prepared from a monocyclic aromatic amino acid containing an ethylenically unsaturated aliphatic radical.

8. The process of claim 5 further characterized in that said polymer is prepared from an aliphatic ethylenically unsaturated amino acid.

References Cited

UNITED STATES PATENTS

| 2,275,210 | 3/1942 | Urbain et al. | 210—37 |
| 3,078,140 | 2/1963 | Hatch | 210—38 X |
| 3,205,184 | 9/1965 | Hatch | 210—37 X |

OTHER REFERENCES

Report No. 27; Saline Water Conversion; Advances in Chemistry Series; American Chemical Society; Washington, D.C., 1960; pp. 50–53 relied on.

REUBEN FRIEDMAN, Primary Examiner.

C. M. DITLOW, Assistant Examiner.

U.S. Cl. X.R.

210—38, 37; 260—78, 79.3, 89.7